United States Patent [19]
Chekirda et al.

[11] 4,076,309
[45] Feb. 28, 1978

[54] SEAT RECLINER INCLUDING ADJUSTMENT MECHANISM AND LATCH

[75] Inventors: Russell F. Chekirda; Randall T. Murphy, both of Morristown, Tenn.

[73] Assignee: Lear Siegler, Inc., Morristown, Tenn.

[21] Appl. No.: 758,964

[22] Filed: Jan. 13, 1977

[51] Int. Cl.² .............................................. B60N 1/02
[52] U.S. Cl. .................................. 297/363; 297/367; 297/379
[58] Field of Search .......................... 297/379, 362–367

[56] References Cited

U.S. PATENT DOCUMENTS

| | | | |
|---|---|---|---|
| 3,342,527 | 9/1967 | Bencene | 297/379 |
| 3,737,946 | 6/1973 | Giuliani | 297/367 |
| 3,840,268 | 10/1974 | Johndrow et al. | 297/367 |

FOREIGN PATENT DOCUMENTS

| | | | |
|---|---|---|---|
| 1,296,060 | 5/1962 | France | 297/367 |
| 2,364,755 | 8/1974 | Germany | 297/367 |

*Primary Examiner*—Francis K. Zugel
*Attorney, Agent, or Firm*—Reising, Ethington, Barnard, Perry & Brooks

[57] ABSTRACT

A seat recliner of the disclosure includes an adjustment mechanism that adjustably controls the angular orientation of a seat back relative to an associated seat cushion and also includes a latch that releases the seat back for forward tilting movement to an easy-enter position. Seat back and cushion arms are pivotally interconnected along the tilting axis about which the seat back moves and are positioned relative to each other thereabout by the cooperable action of the adjustment mechanism and the latch. A positioning member of the adjustment mechanism is pivotally located relative to the seat cushion arm about the axis by a locking dog that is moved between locking and nonlocking positions by the cooperable action of a cam and a cam actuator. Dog movement to a nonlocking position releases the positioning member to permit adjustment thereof and a consequent change in the angular orientation of the seat back. The latch is mounted on the seat back arm and engages the positioning member in a latching position to prevent forward tilting seat back movement. In a nonlatching position, the latch disengages the positioning member to permit the seat back to pivot forwardly independently of the adjustment mechanism to the forward easy-enter position. The construction and arrangement of the arms, the locking dog, a latch member of the latch, the positioning member, a shaft that connects the arms, a cover plate that positions the locking member in an opening of the positioning member, and a counterbalance spring provide cooperation enhancing the recliner operation.

8 Claims, 6 Drawing Figures

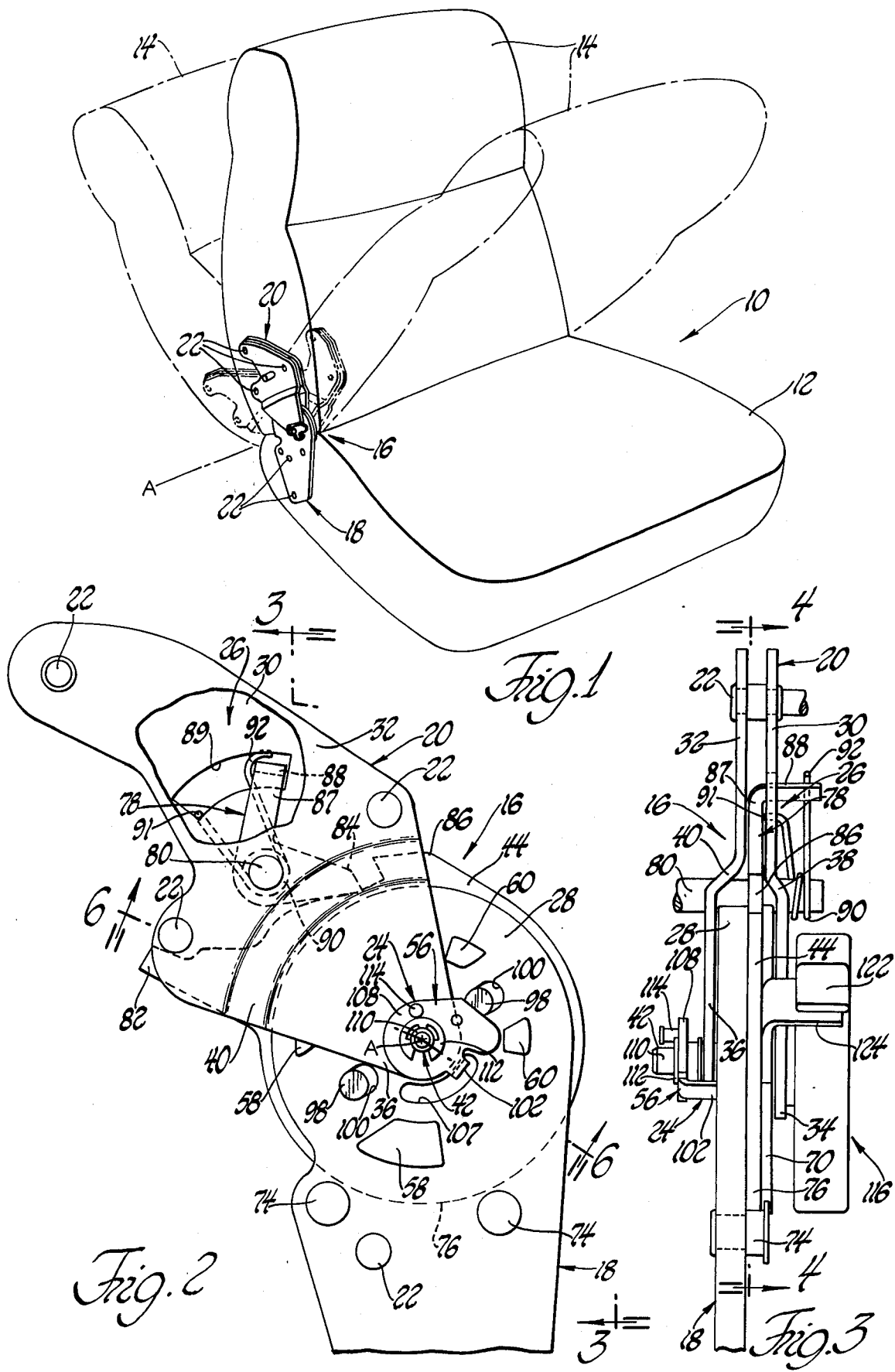

SEAT RECLINER INCLUDING ADJUSTMENT MECHANISM AND LATCH

BACKGROUND OF THE INVENTION

1. Field of the Invention

This invention relates to a seat recliner for adjustably positioning a seat back relative to an associated seat cushion, and particularly relates to such recliners as used with vehicle seats in which the seat back must tilt forwardly to an easy-enter position to permit ingress and egress from the space rearward of the seat.

2. Description of the Prior Art

Seat recliners are utilized with vehicle seats to control the angular position of the seat back with respect to the associated seat cushion in an adjustable manner that permits any particular occupant to have his or her desired seating position that provides the most comfort. These recliners have found their greatest usage with vehicle front seats as opposed to rear seats. Front seats used with vehicles of the two door type, as opposed to those of the four door type, are usually movable in a tilting manner to a forward easy-enter position that affords ample access space to the rear seat behind the front seat.

SUMMARY OF THE INVENTION

An object of the present invention is to provide an improved seat recliner having an adjustment mechanism for adjustably controlling the angular position between seat cushion and seat back arms and also including a latch for selectively releasing the arms for pivotal movement independently of each other so that the seat back arm can move to a forwardly tilted easy-enter position. In carrying out this object, the arms are respectively attachable to a seat cushion and a seat back and are pivotally interconnected with each other about the tilting axis of seat back movement. A positioning member of the adjustment mechanism is adjustably positioned on one of the arms about the axis of tilting seat back movement. The latch is mounted on the other arm and has a latching position where it engages the positioning member to locate the seat back in a tilted position corresponding to the adjusted position of the positioning member. In a non-latching position, the latch disengages the positioning member and thereby allows tilting forward movement of the seat back to its easy-enter position.

A preferred construction of the recliner has the positioning member of the adjustment mechanism adjustably fixed to the seat cushion arm and the latch extending between the seat back arm and the positioning member in its latching position. A pair of plates fixed to each other in a spaced relationship provide the seat back arm and have spaced ends between which a plate-like end of the seat cushion arm is received. A locking dog of the adjustment mechanism is mounted on the seat cushion arm end of movement between locking and nonlocking positions with respect to the positioning member and has locking teeth that are interengaged with locking teeth of the positioning member in the locking position to adjustably locate the positioning member about the tilting axis. The locking dog is also located between the spaced ends of the seat back arm plates preferably within an opening of the positioning member in which the teeth thereof are positioned in a curved configuration.

A shaft fixed to the seat cushion arm end extends between the spaced ends of the seat back plate ends to pivotally interconnect the arms and also extends through the opening of the positioning member as well as through an opening in the locking dog. A cover plate fixed to the positioning member closes the opening thereof from one side and pivotally supports the positioning member on the shaft. The locking dog is maintained within the opening of the positioning member by the cover plate in a slidably supported relationship with respect to the plate-like end of the seat cushion arm. A laterally extending flange on the cover plate is connected to the outer end of a counterbalance spring whose inner end is connected to the shaft such that the spring counterbalance the seat back when the adjustment mechanism is being adjusted to change the angular position of the seat back. Adjustment is provided by a cam pivotally supported on the shaft within the locking dog opening and pivotally moved thereon by an actuator also pivotally supported on the shaft.

The latch of the recliner includes a latch member mounted for movement between latching and nonlatching positions with respect to the positioning member. In the latching position, the latch member engages the positioning member to prevent tilting movement of the seat back relative to the seat cushion. In the nonlatching position, the latch member disengages the positioning member to permit the seat back movement relative to the seat cushion and thereby enable the seat back to be moved forwardly to its easy-enter position. Adjacent the latch member, the spaced plates of the seat back arm are located closer to each other than adjacent their spaced ends between which the seat cushion arm end, the positioning member, and the cover plate are received. Inclined portions of the spaced plates connect the farther spaced ends thereof with the closer spaced portions between which the latch member is supported.

The objects, features and advantages of the present invention are readily apparent from the following detailed description of the preferred embodiment taken in connection with the accompanying drawings.

BRIEF DESCRIPTION OF THE DRAWINGS

FIG. 1 is a perspective view of a vehicle seat with a recliner according to the present invention for controlling tilting movement of the seat back with respect to the seat cushion;

FIG. 2 is a partial side elevation view of the recliner shown in FIG. 1;

FIG. 3 is an elevation view of the recliner taken along line 3—3 of FIG. 2;

DETAILED DESCRIPTION OF THE PREFERRED EMBODIMENT

Figure 4:
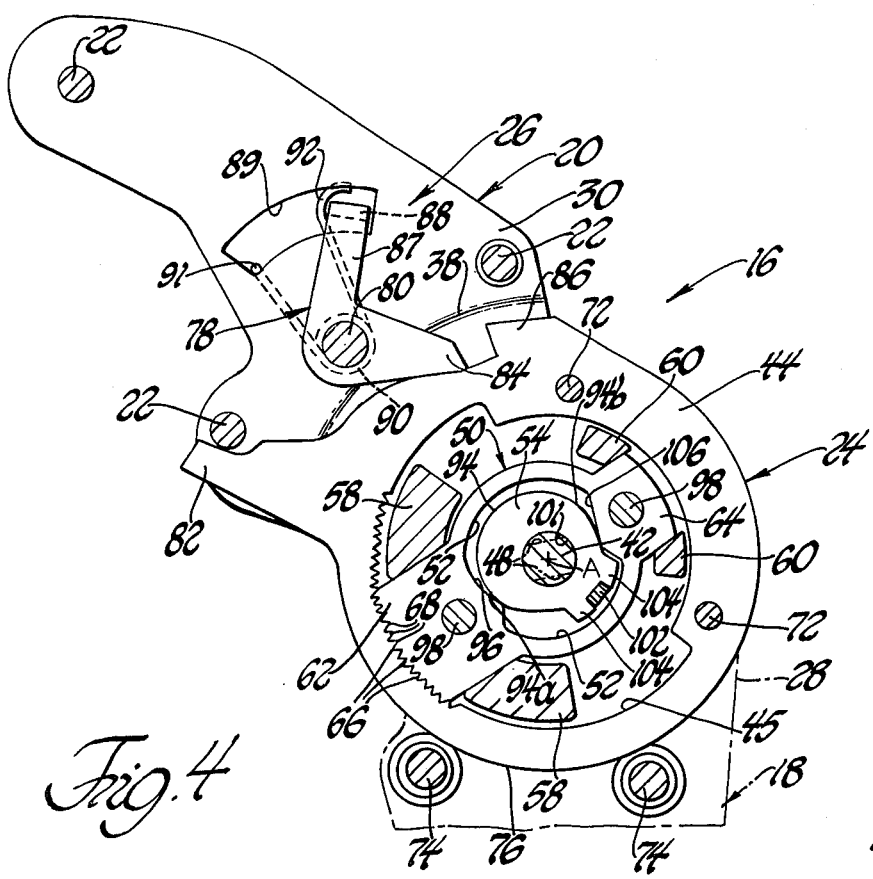
FIG. 4 is a sectional view of the recliner taken along line 4—4 of FIG. 3 and is shown locked in a position that corresponds to its seat back in the forwardmost seating position.

Referring to FIG. 1, a seat indicated by 10 includes a seat cushion 12 and a seat back 14 that have respective unshown frames pivotally connected in a suitable manner about a tilting axis A. A recliner 16 extends between the seat cushion 12 and the seat back 14 to control the positioning of the seat back with respect to the seat cushion. Seat cushion and seat back arms respectively indicated by 18 and 20 are secured to the frames of their associated seat components by pins 22 and are pivotally interconnected with each other about the tilting axis A. As will be more fully hereinafter described, recliner 16 includes an adjustment mechanism that adjustably positions the seat back 14 relative to the seat cushion 12 in the forwardmost seating position shown by solid lines or in a number of rearwardly inclined seating positions as shown by phantom lines. Also, a latch of the recliner is releasable to permit forward movement of the seat back to the easy-enter position shown where access space to the area rearward of the seat is afforded an occupant entering or leaving the vehicle through an unshown adjacent side door.

With reference to FIGS. 2 and 3, the recliner adjustment mechanism and latch are respectively indicated by 24 and 26 and cooperatively control the angular relationship between the seat cushion arm 18 and the seat back arm 20. Seat cushion arm 18 has a plate-like end 28 through which the tilting axis A of seat back movement extends. Seat back arm 20 is comprised of a pair of inner and outer plates 30 and 32 that are secured to each other in a spaced relationship by the pins 22. Latch 26 is located intermediate the plates 30 and 32 adjacent their upper portions which are spaced closer to each other than lower ends 34 and 36 of the plates, respectively. Inclined plate portions 38 and 40 connect the plate ends 34 and 36 with the upper portions of the plates as best seen in FIG. 3. A shaft 42 extending between the seat cushion arm end 28 and the seat back plate ends 34 and 36 pivotally interconnects the arms 18 and 20 about the tilting seat back axis A.

Figure 6:
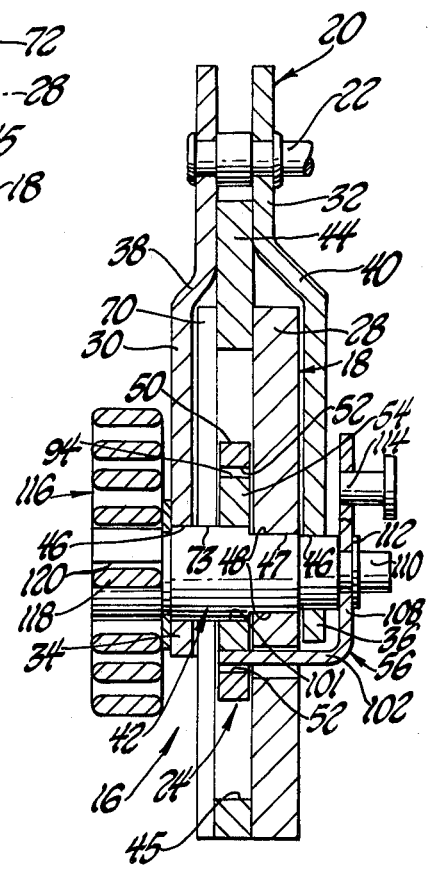
FIG. 6 is a sectional view of the recliner taken along line 6—6 of FIG. 2.

With combined reference to FIGS. 4 and 6, adjustment mechanism 24 includes a positioning member 44 of a generally ring shape located between the seat back plate ends 34 and 36. Shaft 42 extends through an opening 45 of the positioning member 44 along axis A and through openings 46 in the seat back plate ends 34 and 36 as well as through an opening 47 in the seat cushion arm end 28. Flats 48 on shaft 42 and a complementary shape of seat cushion arm end opening 47 pivotally fix the shaft to the seat cushion arm. A locking dog 50 is received within the positioning member opening 45 and has an opening 52 which receives an actuating cam 54 controlled by an actuator 56 (FIG. 6). Spaced pairs of partial pierces 58 and 60 in the seat cushion arm end 28 respectively slidably support first and second ends 62 and 64 of the locking dog 50. Dog end 62 includes locking teeth 66 that are engageable with locking teeth 68 of the positioning member 44 within its opening 45 in order to pivotally secure the positioning member with respect to the seat cushion arm. Positioning member teeth 68 are arranged in an arcuate shape about the tilting axis A to permit the positioning member to be pivotally secured in a number of adjusted positions about the tilting axis A so as to adjustably position the seat back arm 20 in cooperation with the latch 26 as is more fully hereinafter described. Dog 50 is selectively moved by cam 54 upwardly and to the right from the locking position of FIG. 4 to a nonlocking position where its locking teeth 66 disengage the locking teeth 68 of the positioning member 44 to permit pivotal adjustment thereof about the tilting axis. Positioning member 44 is fixed to a cover plate 70 by partial pierces 72. Cover plate 70 has an opening 73 through which shaft 42 extends so as to be pivotally supported thereby in cooperation with pins 74 on the seat cushion arm 28. Pins 74 slidably engage the round periphery 76 of positioning member 44 as it pivots about axis A with the locking dog 50 in its nonlocking position. During its movement between the locking and nonlocking positions, the locking dog 50 is maintained within positioning member opening 45 by slidably interengaged surfaces thereof with both cushion arm end 28 and cover plate 70.

Figure 5:
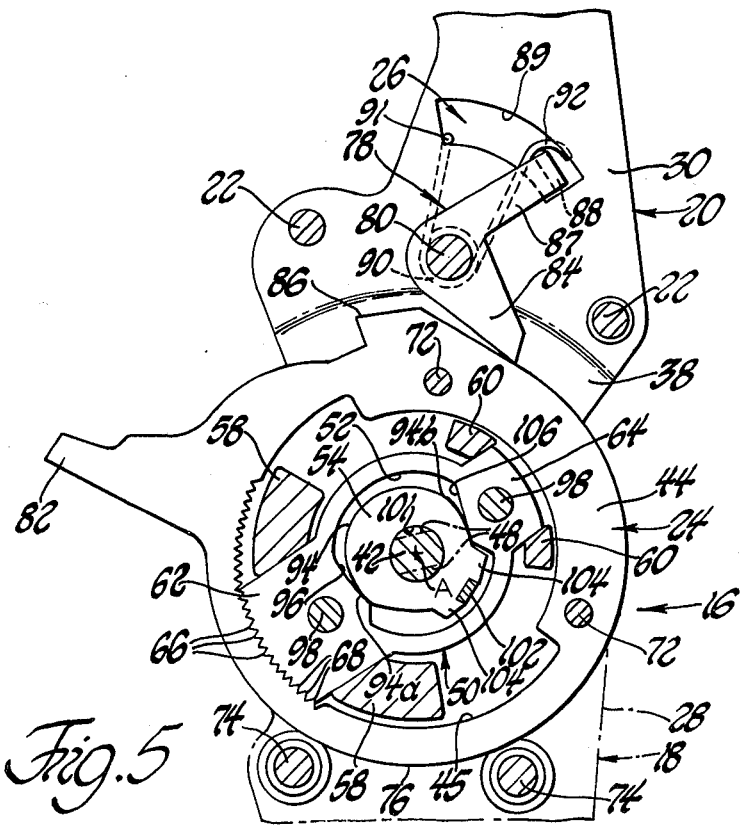
FIG. 5 is a view taken in a similar direction to FIG. 4 but with a latch of the recliner released to permit seat back movement to a forwardly tilted easy-enter position.

Latch 26 as seen in FIGS. 2–4 includes a latch member 78 located between the seat back plates 30 and 32 and fixed on a pin 80 for pivotal movement with this pin such as by splines. One of the pins 22 that interconnects the seat back arm plates engages a rearwardly extending projection 82 of the positioning member 44 in order to limit rearward pivoting of the seat back arm 20 relative to the seat cushion arm 18. A lower latching leg 84 of latch member 78 engages an upwardly extending latching projection 86 of the positioning member 44 in order to limit forward pivoting of the seat back arm 20 relative to the seat cushion arm 18. The latch member 78 also has an upwardly extending leg 87 with a bent end 88 that extends through a curved slot 89 in the plate 30. A biasing spring 90 encircles the pin 80 and has one leg 91 hooked within slot 89 and another leg 92 hooked over leg end 88 of the latch member. Spring 90 normally biases the latch member clockwise to the latching position where its leg 84 engages the latching projection 86. A suitable handle connected to pin 80 is manually pivoted to move the latch member 78 counterclockwise against the bias of spring 90 to a nonlatching position. In the nonlatching position, the latch member leg 84 is located above the latching projection 86 and the arm 20 is then free to pivot forwardly as shown in FIG. 5. After handle release, spring 90 maintains slidable engagement of the latch member leg 84 with the positioning member 44 clockwise of its latching projection 86.

With reference to FIG. 4, the locking dog 50 is maintained in its locking position of FIG. 4 by an outer surface 94 of cam 54. Cam surface 94 has a lobe 94a that moves into an overcenter locking relationship with a curved locking surface 96 of the dog adjacent its first tooth end 62. In this locking relationship, the cam surface lobe 94a is located below and to the right of a line through guide pins 98 on the dog ends. Slots 100 in the seat cushion arm end 28 (see FIG. 2) receive these guide pins 98 and support the locking dog 50 for movement between its locking position of FIG. 4 and the nonlocking position thereof upwardly and to the right from the locking position. The overcenter relationship of the cam in the locking position prevents cam rotation due to forces applied to the dog by the positioning member 44 and thereby maintains the dog in the locking position. Cam 54 has a central opening 101 that receives shaft 42 so as to be pivotally supported about axis A. An axially extending actuator arm 102 received between a pair of lugs 104 on cam 54 is used to rotate the cam counterclockwise into its locking relationship shown and clockwise so that a cam surface lobe 94b thereof engages a rectilinear unlocking surface 106 of the dog to move the dog upwardly and to the right to its non-locking position. Actuator arm 102 extends through a curved slot 107 (FIG. 2) in the seat cushion arm end 28 and is supported by an outer portion 108 of the actuator as seen in FIG. 6 for rotational support about a reduced diameter portion 110 of the shaft with a clip 112 securing the actuator to the shaft. A projection 114 on the actuator 56 allows a suitable handle or linkage connection to a handle to be utilized to move the actuator from the outer side of seat plate end 36. When the locking dog 50 is maintained in its nonlocking position, the seat back arm 20 can be pivotally adjusted relative to the seat cushion arm 18 to control the tilted position of the seat back. A counterbalance spring 116 shown in FIG. 6 counterbalances the weight of the seat back during this adjusting. Spring 116 has an inner end 118 received within a slot 120 in the inboard end of shaft 42 and also has an outer end 122 (FIG. 3) hooked over a flange 124 of the cover plate 70 fixed to the positioning member 44. Thus, as the locking dog is in its nonlocking position, spring 116 counterbalances the seat back weight to permit adjustment from the forwardmost seat back position corresponding to FIG. 4 to the rearwardly inclined positions as the positioning member 44 rotates about the tilting axis A. In the rearwardmost tilted position, the toothed dog end 62 will engage the positioning member locking teeth 68 adjacent the clockwise end of the curve configuration of these teeth.

While a preferred embodiment of the recliner has herein been described in detail, those familiar with this art will recognize various alternative designs and embodiments for practicing the present invention as defined by the following claims.

What is claimed is:

1. A seat recliner for adjustably controlling the angular orientation of a seat back relative to an associated seat cushion about a tilting axis, the recliner comprising: a seat cushion arm for securing the recliner to the seat cushion; a seat back arm for securing the recliner to the seat back and being pivotally connected to the seat cushion arm about the tilting axis; an adjustment mechanism including a positioning member pivotally movable relative to the arms about the tilting axis; the adjustment mechanism also including a locking dog mounted on one of the arms for movement between locking and nonlocking positions relative to the positioning member; said locking dog and positioning member having teeth that are interengaged in the locking position of the dog to adjustably locate the positioning member relative to the one arm about the tilting axis; and a latch for selectively securing the other arm to the positioning member, the latch including a latch member mounted on the other arm and having a latching position where the latch member extends between the positioning member and the other arm to locate the seat back arm in a tilted position corresponding to the adjusted position of the positioning member, and the latch member having a nonlatching position that releases the other arm from the positioning member and thereby allows tilting forward movement of the seat back arm to an easy-enter position, said other arm including two plates fixed to each other in a spaced relationship with the latch member of the latch mounted therebetween.

2. A recliner as in claim 1 wherein the seat back includes the two spaced plates which have spaced ends through which the tilting axis extends, the seat cushion arm including a plate like end, and the seat cushion end, the positioning member and the locking dog being located between the spaced plate ends of the seat back arm.

3. A recliner as in claim 2 wherein the positioning member includes an opening that receives the dog, the dog and the seat cushion arm having slidably interengaged surfaces, and a cover plate that maintains the locking dog within the opening of the positioning member.

4. A recliner as in claim 3 including a shaft fixed to the seat cushion arm and pivotally supporting the seat back plate ends along the tilting axis, and a counterbalance spring extending between the shaft and the cover plate to bias the positioning member in a forward direction relative to the seat.

5. A recliner as in claim 4 wherein the locking dog includes an opening through which the shaft extends, and a cam pivotally movable on the shaft to engage and move the locking dog between its locking and nonlocking positions.

6. A recliner as in claim 5 further including an actuator having a support portion pivotally mounted on the shaft adjacent one of the seat back plate ends and an arm that extends axially relative to the shaft to pivot the cam and move the locking dog between its locking and nonlocking positions.

7. A recliner as in claim 2 wherein the seat back plates include inclined portions adjacent the seat cushion arm end.

8. A seat recliner for adjustably controlling the angular orientation of a seat back relative to an associated seat cushion about a tilting axis, the recliner comprising: a seat cushion arm for securing the recliner to the seat cushion and having a plate-like end through which the tilting axis extends; a seat back arm for securing the recliner to the seat back and including a pair of spaced plates having ends through which the tilting axis extends with the seat cushion arm end therebetween; a shaft fixed to the seat cushion arm end extending between the seat back plate ends along the tilting axis to pivotally connect the arms along the axis; a ring-shaped positioning member having a central opening through which the shaft extends and including locking teeth arranged in a curved shape within the opening about the tilting axis; a cover plate pivotal on the shaft and fixed to the positioning member to close the opening thereof and provide pivotal support thereof on the shaft; a locking dog mounted on the seat cushion arm end for movement between a locking and nonlocking position within the positioning member opening; said locking dog including teeth that engage the teeth on the positioning member in the locking position to prevent pivotal movement thereof and which disengage the positioning member teeth in the nonlocking position to permit pivotal adjusting movement of the positioning member; the locking dog having an opening through which the shaft extends; a cam pivotal on the shaft within the locking dog opening to move the dog between the locking and nonlocking positions; an actuator pivotal on the shaft to pivot the cam; a latch including a latch member mounted intermediate the spaced seat back arm plates for movement thereon between latching and nonlatching positions; the latch member engaging the positioning member in the latching position thereof to thereby locate the seat back in a tilted position corresponding to the position in which the positioning member is pivotally adjusted; the latch member disengaging the positioning member in the nonlatching position thereof to permit tilting seat back movement to a forward easy-enter position; and a counterbalance spring extending between the shaft and the cover plate to bias the seat back arm in a forward direction when the latch member is in its latching position engaged with the positioning member.

* * * * *